United States Patent [19]

Kilius et al.

[11] Patent Number: 5,324,755
[45] Date of Patent: Jun. 28, 1994

[54] GLASS FIBER REINFORCED COMPOSITION OF PROPYLENE POLYMER GRAFTED WITH STYRENIC MONOMER AND CONTAINING STYRENIC POLYMER

[75] Inventors: Darrel E. Kilius; Kyle D. Eastenson, both of New Castle County, Del.

[73] Assignee: Himont Incorporated, Wilmington, Del.

[21] Appl. No.: 142,557

[22] Filed: Oct. 22, 1993

Related U.S. Application Data

[63] Continuation of Ser. No. 903,626, Jun. 24, 1992, abandoned.

[51] Int. Cl.$^5$ .............................................. C08K 9/06
[52] U.S. Cl. ................................. 523/214; 523/200; 523/202; 523/206; 524/504; 524/505; 525/71
[58] Field of Search ............... 523/200, 202, 206, 214; 524/504, 505; 525/71

[56] References Cited

U.S. PATENT DOCUMENTS

| | | | |
|---|---|---|---|
| 4,663,369 | 5/1987 | Kawai et al. | 523/203 |
| 4,740,543 | 4/1988 | Matsuno et al. | 524/88 |
| 4,957,974 | 9/1990 | Ilenda et al. | 525/301 |
| 4,983,647 | 1/1991 | Ueno et al. | 523/220 |
| 4,990,558 | 2/1991 | DeNicola, Jr. et al. | 524/504 |
| 5,030,682 | 7/1991 | Nomura et al. | 524/522 |

Primary Examiner—Paul R. Michl
Assistant Examiner—U. K. Rajguru

[57] ABSTRACT

Disclosed are compositions comprising, (a) a propylene polymer material grafted in the solid state with (i) styrenic polymer and further comprising (ii) ungrafted styrenic polymer, and, optionally (iii) a vinyl comonomer and when the optional vinyl comonomer is used, (iv) styrenic-vinyl copolymer; and (b) glass fibers treated with an organic silane compound; and optionally (c) at least one rubber polymer component comprising (1) from about 0 to 100% of at least one of (i) monoalkenyl aromatic hydrocarbon-conjugated diene block copolymers, (ii) hydrogenated products of (i), or (iii) mixtures of (i) and (ii); and (2) from about 100 to 0% of an olefin copolymer rubber; and (d) a coupling agent for the glass fibers and propylene polymer material plus said rubber polymer. The compositions exhibit a preferred balance of stiffness and impact strength at moderate cost and exhibit excellent surface qualities, making them particularly useful in molded parts.

13 Claims, No Drawings

GLASS FIBER REINFORCED COMPOSITION OF PROPYLENE POLYMER GRAFTED WITH STYRENIC MONOMER AND CONTAINING STYRENIC POLYMER

This application is a continuation of application Ser. No. 07/903,626, filed Jun. 24, 1992, now abandoned.

FIELD OF THE INVENTION

This invention relates to glass fiber reinforced compositions comprising (a) a propylene polymer material grafted in the solid state with styrenic monomer and preferably visbroken and (b) glass fiber preferably treated with a sizing agent such as an aminosilane or epoxysilane; optionally (c) (1) one or more monoalkenyl aromatic hydrocarbon-conjugated diene block copolymers, hydrogenated products thereof or mixtures thereof, with or without (2) olefin copolymer rubber; and (d) a fiber glass-polymer coupling agent; alternatively, the grafted propylene polymer material is grafted with a styrenic monomer and a vinyl comonomer.

BACKGROUND OF THE INVENTION

Glass fibers are the largest volume reinforcing material for thermoplastics. The particular advantage of reinforcing with glass fibers is the potential for imparting further strength and rigidity to obtain relatively high modulus in combination with improved impact properties. Utilizing relatively short glass fibers permits the use of extrusion and injection molding processes typically used in the thermoplastics industry. Glass fiber reinforced thermoplastic compositions are used in a variety of applications, including athletic equipment, household products, batteries, pump housings, etc. Glass fiber reinforced polypropylene is a commercially available product (e.g., HiGlass, HIMONT U.S.A., Inc.) which has superior stiffness, heat resistance, etc. compared to unfilled polypropylene. However, further improvements are desired to provide improvements in physical properties to a level approaching the more expensive engineering thermoplastic resins.

U.S. Pat. No. 4,663,369 discloses glass fiber filled, grafted polypropylene compositions in which the grafting reaction is limited to a solution process and the use of a neutralizing agent for catalyst residues is required. It is taught that where a radically polymerizable unsaturated compound is graft polymerized onto crystalline polypropylene in a process which heat-treats by means of an extruder or Banbury mixer, the radically polymerizable compound remains in a large quantity, whereby the resulting composition is colored and poor with regard to improving stiffness and impact properties.

A modified polypropylene, disclosed in U.S. Pat. No. 4,957,974 as useful in blends with e.g., polyesters (col. 12, lines 57–59), polyamides or nylons (col. 13, lines 2–4) and polycarbonates (col. 13, line 6), contains as the essential modifier for the polypropylene a graft copolymer of a methacrylic ester, e.g., methyl methacrylate and can include an acrylic or styrenic monomer copolymerizable with the ester, including glycidyl methacrylate (col. 7, line 68).

U.S. Pat. No. 4,740,543 (Matsuno et al.) discloses glass fiber filled crystalline propylene-ethylene block copolymer compositions and including 15 to 20 weight % ethylene-propylene copolymer rubber useful as a vehicular instrument panel wherein at least a part of the block copolymer is modified with a modifying agent selected from an unsaturated organic acid (such as acrylic acid or maleic acid anhydride) or a derivative of an unsaturated organic acid (col. 2, lines 64–68). Concentration and dimensional limitations for the components are also specified including the modifying agent (0.01 to 5 weight % of the block copolymer, col. 3, lines 3–7); glass fibers are specified such that each fiber has an average diameter of 10 microns (col. 3, lines 35–40); and melt flow rate of the copolymer is within the range of 5 to 10 g/10 minutes (col. 3, lines 10–15). Furthermore, the rubber component is narrowly specified as having a Mooney viscosity (ML 1+4 @100° C.) of not lower than 13 or greater than 19 (col. 3, lines 59–66) and useful in the blend in the concentration range of 15 to 20 weight % (col. 4, lines 53–59). A method of modifying the propylene-ethylene block copolymer is not disclosed.

U.S. Pat. No. 4,983,647 (Ueno et al.) discloses compositions which include a modified ethylene-propylene block copolymer modified with an unsaturated acid or their anhydride or an organosilane in the presence of an organic peroxide as well as blends of modified and unmodified polypropylene (col. 2, lines 47–61); the ethylene content must be at least 2% and no more than 30% by weight. Furthermore, it is disclosed that the amount of modifier is limited to 0.01 to 3 parts by weight per hundred parts by weight of the crystalline ethylene-propylene block copolymer to be modified. Additionally, there is included in the composition 3 to 20% by weight of an ethylene-propylene rubber, 2 to 12% by weight of a glass fiber and there is required to be present, 15 to 35% by weight of mica with a specified average particle diameter and aspect ratio (col. 3, line 60 to col. 4, line 60). The glass fiber length is specified as in the range of 2 to 15 mm (col. 4, lines 14–18).

U.S. Pat. No. 4,990,558 (DeNicola et al.) discloses compositions of a styrene polymer grafted onto a propylene polymer material and a rubber component. In a preferred method, the grafted copolymer is prepared by grafting in the presence of a free radical polymerization initiator (col. 5, line 33). It is also disclosed that various fillers and reinforcing agents, including carbon black and glass fibers, may be included in the composition at concentration levels up to about 80 parts by weight based on the total weight of graft polymer and rubber component (col. 6, lines 63–68).

U.S. Pat. No. 5,030,682 (Nomura et al.) discloses glass fiber reinforced polyolefin resin composition comprising polypropylene, polybutene-1 and glass fiber; 0.01 to 3 parts by weight of a crystal nucleating agent; and optionally, there is included up to 5 parts by weight of polyolefin modified with an unsaturated carboxylic acid derivative per 100 parts by weight of the resin composition (Abstract and Claims). It is also disclosed that the modified polyolefins include polyethylene, polypropylene and ethylene-propylene copolymer which are modified with unsaturated carboxylic acids, unsaturated carboxylic acid derivatives, chlorine and vinyl silane. A melt kneading process utilizing a peroxide is described for modifying the polyolefin. The required crystal nucleating agents are described in detail (col. 4, line 37 to col. 9, line 39). It is stated that polybutene-1 in the specified amount is "essential" for obtaining the object of the invention, as is the specified amount of crystal nucleating agent (col. 15, lines 8–24).

SUMMARY OF THE INVENTION

It has been found that compositions comprising, (a) a propylene polymer material grafted in the solid state with (i) styrenic polymer and further comprising (ii) ungrafted styrenic polymer as a component; and (b) glass fibers treated with an organic silane compound; and optionally (c) from about 1 to about 25% of at least one rubber polymer component comprising (1) from about 0 to 100% of at least one of (i) monoalkenyl aromatic hydrocarbon-conjugated diene block copolymers, (ii) hydrogenated products of (i), or (iii) mixtures of (i) and (ii); and (2) from about 100 to 0% of an olefin copolymer rubber; and (d) a coupling agent for said glass fibers to improve interaction between the glass fibers, propylene polymer material and rubber polymer; wherein the total amount of (a)+(b)+(c)+(d) is 100%, exhibit excellent flexural and tensile strength and flexural modulus, surface appearance and improved impact resistance.

Another embodiment of the invention further includes in the composition, (e) a monomer copolymerizable with the styrenic polymer comprising a vinyl moiety and, when the optional vinyl moiety is used, further comprises, (f) ungrafted styrenic polymer copolymerized with the vinyl moiety.

In still another embodiment of the invention the coupling agent is a propylene polymer material which has been modified by chemical reaction with an ethylenically unsaturated polycarboxylic acid or a derivative of such acid.

In a further embodiment of the invention, the grafted propylene polymer is visbroken in the presence of a radical source, e.g., an organic peroxide, in the melt, utilizing, for example, an extruder at elevated temperature, to improve the flow properties of the composition and, surprisingly, the desirable physical properties of the glass fiber filled composition.

The compositions of the invention are useful in the manufacture of molded articles, such as automotive parts, appliances and motor housings and a desirable combination of stiffness and impact strength at reasonable cost and which can be prepared in the solid or melt state, thus avoiding the use and environmental difficulties associated with a solvent based process.

DETAILED DESCRIPTION OF THE INVENTION

Unless otherwise specified all percentages and parts are by weight in this specification.

Component (a) of the invention, the grafted propylene polymer material, is present in the amount of from about 40 to about 95% by weight, preferably, from about 45 to about 85%, most preferably from about 50 to about 75% based on the total composition; particularly preferred is from about 50 to about 70%, depending on the balance of properties desired for the particular end use application of the blend. When optional component (c) is used (see below), the effective concentration of (a) will be reduced since the total for all elements is 100%. The grafted polymer of the present invention is a styrenic-monomer grafted propylene polymer material in which styrenic polymer per se is present. Styrenic grafted propylene polymer material as used in this specification means those grafted propylene polymer materials wherein the styrenic grafting monomer (or moiety) is selected from the group consisting of styrene, an alkyl ring - substituted styrene where the alkyl is methyl or ethyl, combinations thereof wherein the alkyl ring-substituted styrene is present in an amount of from 5 to 95%, or a combination of styrene or an alkyl ring-substituted styrene with 5 to 40% of alpha-methylstyrene or alpha-methylstyrene derivatives. Preferred grafting monomers are styrene and mixtures of styrene and alpha-methyl styrene. In an alternative version of the grafted propylene polymer, a vinyl comonomer is used during the grafting process in addition to the styrenic monomer. The vinyl comonomer moiety to be copolymerized or coreacted in combination with the styrenic monomer is selected from the group consisting of one or more unsaturated carboxylic acids (preferably mono- or dicarboxylic acids) and derivatives thereof, acrylonitriles and acrylates. Examples of such monomers include acrylic acid, methacrylic acid, maleic acid, citraconic acid, maleic anhydride, citraconic anhydride, mono- and dimethyl maleate, methyl acrylate, ethyl acrylate, propyl acrylate, butyl acrylate, methyl methacrylate, ethyl methacrylate, propyl methacrylate, butyl methacrylate, cyclohexyl methacrylate, phenyl methacrylate, benzyl methacrylate, o-methoxyphenyl methacrylate, acrylonitrile, methacrylonitrile, glycidyl acrylate, glycidyl methacrylate and mixtures thereof; preferred are methyl methacrylate (MMA), acrylonitrile and glycidyl methacrylate. When the co-monomer is present during the grafting reaction, there is produced a styrenic-vinyl co-product which is present in the grafted propylene polymer material. For the purposes of this invention, it is to be understood that reference to grafted propylene polymer material includes the presence of styrenic polymer and, when a comonomer is used, styrenic-vinyl monomer copolymer.

The propylene polymer material backbone of component (a) is selected from the group consisting of (i) a homopolymer of propylene, (ii) a random copolymer of propylene and an olefin selected from ethylene and $C_4$–$C_{10}$ alpha-olefins, provided that, when the olefin is ethylene, the maximum polymerized ethylene content is about 10%, preferably about 4%, and when the olefin is a $C_4$–$C_{10}$ alpha-olefin, the maximum polymerized content thereof is about 20%, preferably about 16%, (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%, (iv) a homopolymer of (i) or a random copolymer of (ii) impact-modified with from about 5 to 30% of an ethylene - propylene copolymer rubber, or an ethylene - propylene - nonconjugated diene monomer rubber having a diene content of about 2–8%. The ethylene content of (iv) being from about 20 to about 70%. The $C_4$–$C_{10}$ alpha-olefins include linear and branched $C_4$–$C_{10}$ alpha-olefins such as 1-butene, 1-pentene, 4-methyl-1-pentene, 3-methyl-1-butene, 1-hexene, 3,4-dimethyl-1-butene, 1-heptene, 3-methyl-1-hexene, 1-octene, and the like.

Suitable particulate forms of the grafted propylene polymer material include powder, flake, granulate, spherical, cubic and the like. Preferred are spherical particulate forms prepared from a propylene polymer material having a pore volume fraction of at least about 0.07. Most preferred for preparing the grafted propylene polymer material is a propylene polymer material having (1) a weight average diameter of about 0.4 to 7 mm, (2) a surface area of at least 0.1 m$^2$/g, and (3) a pore volume fraction of at least about 0.07 wherein more than 40% of the pores in the particle have a diameter larger than 1 micron. Such propylene polymer materials are commercially available from HIMONT Italia, S.r.l.

The styrene monomer, alkyl ring-substituted styrene monomer or methylstyrene derivative, except alpha-methylstyrene, can be used alone or in combination with each other or with alpha-methylstyrene to graft onto the propylene polymer material backbone. All except alpha-methylstyrene and its derivatives readily homopolymerize when used alone and graft copolymerize with each other when two or more are present, including alpha-methylstyrene.

Preferred styrenic-vinyl monomer grafted propylene polymer materials of the present invention are grafted copolymers of styrene or of styrene and a methylstyrene derivative monomer and methyl methacrylate on polypropylene or on an impact-modified polypropylene backbone.

The grafting monomer(s), styrenic (plus vinyl monomer when used), are added to the propylene polymer material in a concentration of from about 50 to about 200 parts by weight per hundred (pph) of the propylene polymer material; preferably from about 60 to about 150 pph; most preferably from about 70 to about 120 pph; for example, from about 75 to about 100 pph. The amount of vinyl moiety added during grafting is expressed as a percentage of the total grafting monomers added, i.e., styrenic plus vinyl moieties. Useful concentration of the maximum level of added vinyl monomer moiety varies depending on the class of vinyl monomer used; the minimum level in each instance is about 0.1, preferably about 0.2, most preferably about 0.3 wt. % of the total monomer concentration. Where an acrylate monomer moiety is used, the maximum concentration can be up to total replacement of the styrenic monomer, in other words, 100 wt. % of the total grafting monomer concentration. Where a carboxylic acid or anhydride moiety is used, the maximum concentration of the comonomer is up to about 60 wt. %, preferably up to about 50 wt %; and where an acrylonitrile moiety is used the maximum concentration is up to about 35, preferably up to about 33 wt %.

As a consequence of the reaction in which the styrenic, and optionally vinyl monomer, moieties are grafted to and copolymerized with the propylene polymer material, there is also produced ungrafted styrenic polymer and, optionally, styrenic polymer copolymerized with the vinyl moiety (e.g., polystyrene copolymerized with methyl methacrylate, PS-co-MMA), as a compositional element of (a). When the comonomer is utilized, also present are lesser (minor) quantities of styrenic polymer, and in both instances ungrafted propylene polymer material. The quantity of styrenic polymer copolymerized with a vinyl moiety as a compositional element of the grafted propylene polymer material is from about 35 to about 95 weight percent of the total grafting monomer; more typically from about 45 to about 80 weight percent; most typically from about 50 to about 75 weight percent.

The styrenic (plus optional comonomer) grafted propylene polymer material of the present invention is prepared in the solid state (i.e., wherein the propylene polymer material is not dissolved in a solvent or dispersed in a solvent as a slurry) by the free-radical initiated graft polymerization of the grafting monomers, at free-radical sites on propylene polymer material. The free-radical sites may be produced by irradiation or by a free-radical generating chemical material, e.g., by reaction with a suitable organic peroxide. The general process for carrying out the grafting of propylene polymer material with a styrenic monomer is described in U.S. Pat. No. 4,990,558, which process is useful herein and is incorporated herein by reference.

According to the method where the free-radical sites are produced by irradiation, the propylene polymer material, preferably in particulate form, is irradiated at a temperature in the range of about 10° to 85° C. with high-energy ionizing radiation to produce free-radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomers used, based on the total weight of propylene polymer material and grafting monomers. After the propylene polymer material has been exposed to the monomers for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free-radical deactivation of the resulting graft copolymer is conducted preferably by heating, although it can be accomplished by the use of an additive, e.g., methyl-mercaptan, that functions as a free-radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free-radical sites are produced by an organic chemical compound, the organic chemical compound, preferably an organic peroxide, is a free-radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butylperoxy-3,5,5-trimethyl-cyclohexane, 2,5-dimethyl-2,5-di-tert-butyl-peroxyhexane, and bis(alpha-tert-butyl peroxyisopropylbenzene); peroxyesters, such as tert-butylperoxypivalate, tert-butylperbenzoate, 2,5-dimethylhexyl 2,5-di(perbenzoate), tert-butyl-di(perphthalate), tert-butyl-peroxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph. Particularly preferred is tert-butyl peroctoate as a 50 weight % dispersion in mineral oil, sold commercially under the brand Lupersol PMS.

According to this method, the propylene polymer material, preferably in particulate form, at a temperature of from about 60° C. to 125° C. is treated with from 0.1 to 6.0 pph of a free-radical polymerization initiator described above. The polymer material is treated with the grafting monomers at a rate of addition that does not exceed 4.5 pph per minute at all addition levels monomers, over a period of time which coincides with, or follows, the period of treatment with the initiator. In other words, the monomers and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation.

An unexpected synergy has been found when the grafted propylene polymer material of the present invention is subjected to the process of "visbreaking", preferably prior to the incorporation of the glass fibers (in order to minimize the extent of glass fiber length reduction). Whereas the prior art (U.S. Pat. No. 4,997,875) teaches that the process of visbreaking adversely affects the physical properties of polypropylene compared to the polymer prior to such treatment, e.g., tensile strength and flexural modulus, it has been surprisingly found that the overall balance of properties of the glass fiber filled, grafted propylene polymer of the present invention are improved relative to non-visbroken polymer. The grafted propylene polymer material is preferably a visbroken polymer having a melt flow rate (MFR, according to ASTM D-1238, measured at 230° C., 2.16 kg) of from about 5 to 100, preferably from about 15 to 50, more preferably from about 25 to 45, resulting from a polymer having an original MFR of from about 0.5 to 10, preferably about 5.

The process of visbreaking crystalline polypropylene or a propylene polymer material is well known to those skilled in the art. Generally, it is carried out as follows: propylene polymer material or polypropylene in as-polymerized or as-grafted form, e.g., flaked or pelletized, has sprayed thereon or blended therewith, a prodegradant or free radical generating source, e.g., a peroxide in liquid or powder form or absorbed on a carrier, e.g., polypropylene (Xantrix TM 3024, manufactured by HIMONT U.S.A., Inc). The propylene polymer material/peroxide mixture is then introduced into a means for thermally plasticizing and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the propylene containing polymer as well as to reduce the overall molecular weight and thereby increase the MFR relative to the as-polymerized polymer. For example, a polymer with a fractional MFR (i.e., less than 1), or a polymer with a MFR of 0.5–10, can be selectively visbroken to a MFR of 15–50, preferably 28–42, e.g., about 35, by selection of peroxide type, extruder temperature and extruder residence time without undue experimentation. Sufficient care should be exercised in the practice of the procedure to avoid crosslinking or gelation particularly if the visbreaking process is carried out in the presence of an ethylene-containing copolymer; typically, crosslinking will be avoided where the ethylene content of the copolymer is sufficiently low.

The rate of peroxide decomposition is defined in terms of half-lives, i.e. the time required at a given temperature for one-half of the peroxide molecules to decompose. It has been reported (U.S. Pat. No. 4,451,589) for example, that using Lupersol 101 under typical extruder pelletizing conditions (450° F., 2½ minutes residence time), only $2 \times 10^{-13}\%$ of the peroxide would survive pelletizing.

In general, the prodegradant should not interfere with or be adversely affected by commonly used stabilizers for propylene-containing polymers and should effectively produce free radicals that upon decomposition initiate degradation of the polypropylene moiety. The prodegradant should have a short enough half-life at typical polymer extrusion processing temperatures, however, so as to be essentially entirely reacted before exiting the extruder. Preferably the prodegradant has a half-life in the propylene polymer material of less than 9 seconds at 550° F. so that at least 99% of the prodegradant reacts in the molten polymer before 1 minute of extruder residence time. Such prodegradants include, by way of example and not limitation, the following: 2,5-dimethyl 2,5bis-(t-butylperoxy) hexyne-3 and 4 methyl 4 t-butylperoxy-2 pentanone (e.g. Lupersol 130 and Lupersol 120 available from Lucidol Division, Penwalt Corporation, 3,6,6,9,9-pentamethyl-3-(ethyl acetate) 1,2,4,5-textraoxy cyclononane (e.g., USP-138 from Witco Chemical Corporation), 2,5-dimethyl-2,5 bis-(t-butylperoxy) hexane (e.g., Lupersol 101) and alpha, alpha' bis-(tert-butylperoxy) diisopropyl benzene (e.g., Vulcup R from Hercules, Inc.). Preferred concentration of the free radical source prodegradants are in the range of from about 0.01 to 0.4 percent based on the weight of the polymer(s). Particularly preferred is Lupersol 101 wherein the peroxide is sprayed onto or mixed with the propylene polymer at a concentration of about 0.1 wt. % prior to their being fed to an extruder at elevated temperature; for example, useful conditions are 280° C. extruder barrel temperature, 350 rpm screw speed, in a 40 mm twin screw extruder operating at 125 lb/hr. Extrusion processes relating to the treatment of propylene-containing polymers in the presence of an organic peroxide to increase melt flow rate and reduce viscosity are known in the art and are described, e.g., in U.S. Pat. No. 3,862,265; U.S. Pat. No. 4,451,589 and U.S. Pat. No. 4,578,430.

The glass fibers, component (b) of the present invention include those commercially available glass fibers typically marketed as reinforcing agents and are generally sized with sizing agents. Silane compounds and azidosilanes are typical sizing agents as well as epoxy-group containing compounds. Examples of such organic silane compounds used for the treatment of reinforcing glass fibers are vinyltrichlorosilane, vinyltris(-beta-methoxyethoxy)silane, vinyltriethoxysilane, gamma-methacryloxypropyltrimethoxysilane, beta-(3,4-epoxycyclohexyl)ethyltrimethoxysilane, gamma-glycidoxypropyltrimethoxysilane, N-(beta-aminoethyl)-gamma-aminopropyltrimethoxysilane, N-(beta-aminoethyl)-gamma-aminopropylmethyldimethoxysilane, gamma-aminopropyltriethoxysilane, N-phenyl-gamma-aminopropyltrimethoxysilane, gamma-methylcaptopropyltrimethoxysilane, gamma-chloropropyltrimethoxysilane, etc.

The concentration of glass fibers is from about 5 to about 60 wt. %, preferably from about 15 to about 55%, most preferably from about 25 to about 50%; particularly preferred is from about 30 to about 50 wt. %. The glass fibers can be in the form of short fibers, typically from about 1.6 mm. (1/16 in) to about 7.9 mm. (5/16 in) in length; long fibers, typically from about 12.7 to about 51 mm (½ to 1 in) in length; or in the form of continuous filament fibers. Preferably the fiber is in the short fiber form.

Component (c) according to the present invention is selected from one or more monoalkenyl aromatic hydrocarbon-conjugated diene block copolymers of linear or branched A-B or A-B-A types or radial $(A-B)_n$, where $n=3-20$, and hydrogenated products thereof or mixtures thereof, where A is a monoalkenyl aromatic hydrocarbon polymer block and B is a conjugated diene polymer block. Typical monoalkenyl aromatic hydrocarbon monomers are styrene, $C_1-C_4$ linear or branched alkyl ring-substituted styrene and vinyl toluene. Suitable conjugated dienes are butadiene and isoprene.

The monoalkenyl aromatic hydrocarbon-conjugated diene block copolymers have a number average molecular weight of from 45,000 to 260,000 wherein the proportion of the monoalkenyl aromatic hydrocarbon monomer in the monoalkenyl aromatic hydrocarbon-conjugated diene block copolymer ranges from 5 to 50%, preferably from 15 to 40% and more preferably from 25 to 40%. When a mixture is desired, two or more block copolymers or hydrogenated products thereof in various amounts and types can be used. When a mixture is used it is preferably used in the ratio of about 3:1 to about 1:3, more preferably about 2:1 to about 1:2.

The monoalkenyl aromatic hydrocarbon-conjugated diene block copolymer and their hydrogenated derivatives used in the composition of the present invention are commercially available. The linear block copolymers are preferred.

The block copolymers can be synthesized according to the methods in U.S. Pat. Nos. 3,459,830 and 3,994,856. The method for hydrogenation of the conjugated diene block is also known in the art. The hydrogenation catalyst which can be used includes noble metal catalyst, such as platinum, nickel catalyst and copper-chromium catalyst. Specific examples of the methods for hydrogenation are described in U.S. Pat. No. 4,188,432.

The rubbery polymer which can be used in component (c) of the present invention also may comprise two or more types of polymer rubbers; in a preferred embodiment at least about 20, and preferably at least about 50, percent of this component is at least one monoalkenyl aromatic hydrocarbon-conjugated diene block copolymer. A particularly preferred rubber component is one comprised of about from 20 to 70, more preferably about 50 to 70, percent of a monoalkenyl aromatic hydrocarbon-conjugated diene block copolymer and about from 80 to 30 percent of an EPM or EPDM olefin copolymer rubber.

In an alternative embodiment, the rubbery polymer is selected from the group consisting of EPM and EPDM olefin copolymer rubbers, as described above, and homopolymers of propylene or a random copolymer of propylene and an olefin selected from ethylene and $C_4-C_{10}$ alpha-olefins (as described above for component (a), the propylene polymer material) impact-modified with greater than about 30 wt. % ethylene-propylene copolymer (EPM) rubber, or an ethylene-propylene-nonconjugated diene monomer (EPDM) rubber having a diene content of about 2–8%; i.e., EPM or EPDM olefin copolymer rubber. Preferably the olefin copolymer rubber impact modification concentration in the propylene homopolymer or random copolymer is from about 35 to about 80 wt. %; more preferably from about 40 to about 75 wt. %. Alternatively, rubber component comprised of the block copolymer described above and, instead of the olefin copolymer rubber, a butyl rubber or a random copolymer of butadiene-styrene (SBR) may be used in the composition.

The ethylene-propylene monomer rubber used in the compositions of the invention is an elastomer typically having an ethylene/propylene weight percent ratio in the range of from about 25/75 to about 75/25, preferably from about 40/60 to about 60/40, and an intrinsic viscosity in the range of from about 2.0 to 6.0, preferably from about 2.5 to about 4.0 dl/g.

When component (c) is present in the composition of the present invention, it is used in an amount of from 1 to about 25% by weight based on the total composition; preferably from about 2 to about 20 weight %; most preferably from about 4 to about 15% by weight, depending on the properties to be achieved.

The composition of the invention contains a coupling agent, component (d), which improves the adhesion of the reinforcing glass fibers to the polymer matrix. However, compositions containing essentially no coupling agent, while less versatile, are useful in those applications in which strength requirements are less stringent. Typical coupling agents for use in the preferred composition are olefin polymers which have been chemically modified with an ethylenically unsaturated carboxylic acid or a derivative thereof, such as thus-modified polyethylene, polypropylene, and copolymers of ethylene and propylene with each other or with other alpha olefins. The content of the carboxylic acid or its derivative is about from 1% to about 10%, typically from about 2% to 4%, preferably about from 2 5% to 3.5%, based on the modified polymer. Suitable unsaturated carboxylic acids and derivatives thereof include acrylic acid, maleic acid, itaconic acid, maleic anhydride, citraconic anhydride and itaconic anhydride. Methods of preparing such coupling agents are known in the art; see, for example, U.S. Pat. No. 3,416,990 at col. 2, lines 48 to 63, and U.S. Pat. No. 3,483,276 at col. 1, lines 34–62, the disclosures of which are incorporated herein by reference. Certain thus-modified olefin polymers are commercially available.

The coupling agent, when present, is present in an amount ranging about from 1 to 10, preferably about from 1 to 2, parts per hundred parts propylene polymer material. Most preferably about 1 part per hundred parts polypropylene is used. The preferred coupling agent is a maleic anhydride-modified crystalline polypropylene having a maleic anhydride content of about from 2% to 4%.

The composition of this invention may also contain other fillers, for example, one or more mineral fillers, such as talc, calcium carbonate and mica. When mineral fillers are present, they are typically present in an amount totalling about from 1 to 40 percent by weight of the total composition. Other fillers which can be present include metallic flakes, glass flakes, milled glass, glass spheres and carbon black.

Conventional additives, such as stabilizers and pigments, also may be present. Antioxidant-type stabilizers can be present in an amount of about from 0.05 to 1.0 pph (parts per hundred), based on the weight of propylene polymer material. Antacids, if used, are typically present in an amount of about from 0.05 to 0.5 pph, preferably about from 0.05 to 0.2 pph, based on propylene polymer material weight. Heat stabilizers can be used in an amount of about from 0.05 to 1 pph, based on propylene polymer material weight. Pigments can be used in an amount of about from 0.2 to 5, preferably about from 2 to 3, pph, based on propylene polymer material weight.

Typical antioxidants include hindered phenolic compounds, such as tetrakis[methylene(3,5-ditertiary-butyl 4-hydroxyhydrocinnamate)] methane (e.g., Irganox brand grade 1010, Ciba Geigy). Suitable antacids include alkali and alkaline earth metal stearates, such as sodium stearate and calcium stearate. Thioesters, such as trilauryl trithiophosphate (TLTTP) and distearyl thiodipropionate (DSTDP) are typical heat stabilizers. Phosphonite stabilizers are also particularly useful, such as P-EPQ (made by Sandoz and Ciba Geigy). Suitable pigments include carbon black and titanium dioxide.

The composition of this invention is prepared by mechanically blending in conventional mixing equipment, including single and twin screw extruders and Banbury (brand) internal mixers. Preferably, the compositions are prepared by dry tumble blending the propylene polymer material and the ingredients other than the fiber glass in a blender such as a Henschel brand mixer, and then mixing the blended ingredients in a mixing apparatus, such as a twin screw extruder, at a temperature sufficient to melt the propylene polymer material, i e , about from 165° to 280° C., preferably about from 220° to 260° C., until a homogeneous mixture is obtained prior to addition and dispersion of the glass fiber. The twin screw extruder is preferred since it can have multiple entry ports, commonly referred to as feed ports, for the addition of the ingredients to be extrusion mixed, with at least one feed port generally being about halfway downstream of the first feed port. Hence, all of the ingredients except the fiber glass can be added and extrusion mixed at a temperature sufficient to melt the propylene polymer material and for a time sufficient for a homogeneous blend of these ingredients to be obtained by the time the fiber glass is added at the feed port about halfway downstream of the first feed port. This provides for minimum fiber breakage during the extrusion mixing and for ease of wetting of the fiber glass by the molten grafted propylene polymer thereby enhancing the dispersion of the fiber uniformly throughout the polymer matrix.

The present invention will be illustrated in greater detail with reference to the examples of the invention set forth below. Unless stated otherwise, percentages are expressed as weight percent (wt. %).

EXAMPLE 1

Propylene polymer grafted with styrene (and containing free polystyrene) was prepared using homopolymer polypropylene (spherical form, 5.8 MFR, 0.35 cc/g porosity, 93.8% insoluble in xylene at room temperature (R.T.), Mw/Mn=4.8); it is identified as PP-g-PS. Grafting was carried out as follows: 85 pph styrene, 2.0 pph active peroxide (Lupersol PMS, t-butyl peroxy 2-ethylhexanoate, 50% mineral spirits), grafting temp. 121° C., styrene feed rate 0.9 pph/min. over 90 min. (peroxide co-feed, 0.0444 pph/min.), 30 min. hold at 121° C., drying at 135° C. for 190 min., produced by separate co-continuous addition method. The compositions were typically stabilized with P-EPQ, Irganox 1010, and DSTDP and, in this Example, the stabilizer levels were 0.07%, 0.07% and 0.25% respectively. Impact modified compositions utilized a total of 15% rubber: 7.5% Kraton G 1652 (hydrogenated styrene/butadiene/styrene triblock copolymer produced by Shell Chemical Company and containing 29% styrene, 71% ethylene-butene rubber midblock) plus 7.5% Dutral CO-059 (ethylene-propylene copolymer rubber produced by Dutral, 57% ethylene content, intrinsic viscosity 3.37 dl/g). In addition, grafting conditions for the PP-g-PS used in preparing the impact modified blends differed from those described above as follows: grafting temperature 115° C., styrene add level 84 pph at a feed rate of 1.0 pph/min. over 84 min., peroxide co-feed 0.048 pph/min., and 30 min. hold at 115° C. The glass fiber was Owens Corning 457BA brand, 3/16 inch chopped glass strand manufactured with an amino silane sizing. The preferred coupling agent was Hercoprime G-201 brand manufactured by HIMONT U.S.A., Inc. (polypropylene grafted with maleic anhydride, PP-g-MA). Compositions were prepared as follows: all materials, except glass, were mixed in a Henschel brand mixer and extruded using a 40 mm Werner & Pfleiderer brand extruder; screw speed 350 rpm, barrel temperature 260° C., throughput rate 100 lb./hr. To reduce glass fiber breakdown, a low shear screw profile was used along with downstream glass feeding; vacuum was applied. Test samples were molded in a 5 oz. Battenfeld brand press, using 500° F. barrel temperature, 180° F. mold temperature and 800 psi injection pressure. Tensile testing was performed at 0.2 in./min. (without an extensometer). Flexural and heat distortion temperature (HDT) testing were conducted using molded flex bars. Flex properties were tested at 0.05 in./min. and HDT testing was performed at 264 psi. Izod testing was done using the center of a tensile bar and a two pound hammer (ASTM test methods were utilized).

Test results are summarized in Table 1; control and commercial compositions are included for reference (Compounds 1-1, 6, 11, 16 and 21 are control or reference compositions outside the scope of the invention). Flexural modulus and tensile strength of glass fiber filled PP-g-PS exceeded that of ungrafted polypropylene (PP) by as much as 20%. Flexural strength, weld line strength and elongation were comparable to PP. In these initial examples notched izod impact strength range from equivalent to 20% lower; also in these initial examples, HDT was lower, believed due to the presence of amorphous polystyrene. The use of the coupling agent Hercoprime G-201 (PP-g-MA) improved properties significantly. Surface appearance of the compositions based on PP-g-PS was especially good; no flow lines or surface blemishes were apparent. Color was a light beige which darkened with increasing glass content.

TABLE 1

| COMPOUND 1- | 1* | 6* | 11* | 16* | 21* | 5 | 10 | 15 | 20 | 25 | 2 | 7 | 12 | 17 | 22 | 3 | 8 | 13 |
|---|---|---|---|---|---|---|---|---|---|---|---|---|---|---|---|---|---|---|

TABLE 1-continued

| MATERIAL: | | | | | | | | | | | | | | | | | | | |
|---|---|---|---|---|---|---|---|---|---|---|---|---|---|---|---|---|---|---|---|
| PP-g-PS | 100 | 100 | 100 | 100 | 100 | 90 | 90 | 90 | 90 | 90 | 80 | 80 | 80 | 80 | 80 | 70 | 70 | 70 |
| PP-g-MA, pph | | 0.5 | 1.0 | 1.5 | 2 | | 0.5 | 1 | 1.5 | 2 | | 0.5 | 1.0 | 1.5 | 2 | | 0.5 | 1.0 |
| Glass Fiber | | | | | | 10 | 10 | 10 | 10 | 10 | 20 | 20 | 20 | 20 | 20 | 30 | 30 | 30 |
| PROPERTIES: | | | | | | | | | | | | | | | | | | |
| Notched Izod, ft-lb/in | 0.29 | 0.30 | 0.29 | 0.24 | 0.31 | 0.53 | 0.60 | 0.61 | 0.52 | 0.59 | 0.73 | 1.07 | 1.06 | 1.12 | 1.20 | 0.87 | 1.18 | 1.35 |
| Unnotched Izod, ft-lb/in | 4.40 | 2.80 | 4.40 | 3.70 | 4.20 | 3.38 | 3.28 | 3.74 | 3.34 | 2.20 | 3.63 | 5.19 | 8.03 | 6.19 | 5.87 | 3.51 | 7.03 | 8.11 |
| Flexural Modulus, kpsi | 357 | 363 | 358 | 360 | 358 | 495 | 502 | 501 | 497 | 502 | 695 | 702 | 718 | 698 | 716 | 846 | 970 | 932 |
| Flexural Strength, psi × $10^{-1}$ | 1057 | 1091 | 1085 | 1054 | 1084 | 1084 | 1247 | 1262 | 1190 | 1288 | 1250 | 1590 | 1670 | 1660 | 1730 | 1320 | 1840 | 1950 |
| Tensile Strength (TS), psi × $10^{-1}$ | 614 | 608 | 645 | 607 | 615 | 775 | 911 | 922 | 912 | 930 | 940 | 1190 | 1230 | 1230 | 1220 | 1028 | 1327 | 1429 |
| Weldline TS, psi | 4393 | 4292 | 3850 | 4200 | 4140 | 4300 | 4430 | 4570 | 4490 | 4580 | 3990 | 4410 | 4550 | 4680 | 4590 | 3300 | 4010 | 4160 |
| TS Retention, % | 72 | 71 | 60 | 44 | 67 | 56 | 49 | 50 | 49 | 49 | 42 | 37 | 37 | 38 | 38 | 32 | 30 | 29 |
| Elongation Ult., % | 14* | 11 | 9.6 | 9.5 | 11 | 6.8 | 8.3 | 8.1 | 8.5 | 8.4 | 5.7 | 7.6 | 7.9 | 8.2 | 8.1 | 4.6 | 6.1 | 7.1 |
| Weldline Elong., % | 4.4 | 4.3 | 3.6 | 4.2 | 4 | 8 | 3.1 | 3.2 | 3.2 | 3.3 | 2 | 2.3 | 2.3 | 2.5 | 2.5 | 1.3 | 1.5 | 1.6 |
| HDT (264), °F. | 167 | | | 170 | 207 | | | 210 | 221 | | 223 | | 226 | 251 | | | | |
| MFR, dg/min | 2.5 | 3.1 | 2.0 | 2.2 | 2.3 | | | | | | | | | | 1.4 | | | |

*Control/reference composition

| COMPOUND 1- | 18 | 23 | 4 | 9 | 14 | 19 | 24 | Ref. 1* | Ref. 2* | Ref. 3* | Ref. 4* |
|---|---|---|---|---|---|---|---|---|---|---|---|
| MATERIAL: | | | | | | | | | | | |
| PP-g-PS | 70 | 70 | 50 | 50 | 50 | 50 | 50 | | | | |
| PP-g-MA, pph | 1.5 | 2 | | 0.5 | 1 | 1.5 | 2 | | | | |
| Glass Fiber | 30 | 30 | 50 | 50 | 50 | 50 | 50 | 20 | 30 | 40 | 50 |
| PROPERTIES: | | | | | | | | | | | |
| Notched Izod, ft-lb/in | 1.40 | 1.38 | 0.91 | 1.07 | 1.28 | 1.46 | 1.49 | 1.40 | 1.60 | 1.80 | 1.50 |
| Unnotched Izod, ft-lb/in | 8.04 | 8.93 | 4.11 | 4.20 | 6.78 | 7.09 | 7.83 | 11 | 13 | 13 | 12.2 |
| Flexural Modulus, kpsi | 964 | 956 | 1510 | 1630 | 1630 | 1640 | 1620 | 590 | 820 | 1100 | 1420 |
| Flexural Strength, psi × $10^{-1}$ | 1980 | 2030 | 1560 | 2150 | 2300 | 2400 | 2400 | 1700 | 2075 | 2275 | 2350 |
| Tensile Strength (TS), psi × $10^{-1}$ | 1461 | 1464 | 1117 | 1442 | 1611 | 1657 | 1691 | 1140 | 1350 | 1430 | 1450 |
| Weldline TS, psi | 4210 | 4310 | 2360 | 2750 | 3120 | 3170 | 3060 | NA | 3900 | 3631 | NA |
| TS Retention, % | 29 | 29 | 21 | 19 | 19 | 19 | 18 | NA | 29 | 25 | NA |
| Elongation Ult., % | 7.3 | 7.3 | 3.6 | 4.7 | 5.4 | 5.6 | 5.8 | 2.9 | 2.2 | 1.9 | 1.2 |
| Weldline Elong., % | 1.7 | 1.7 | 0.6 | 0.7 | 0.8 | 0.8 | 0.8 | NA | NA | NA | NA |
| HDT (264), °F. | | 260 | 265 | | | | 269 | 300 | 305 | 308 | 310 |
| MFR, dg/min | | | 1.2 | | | | | 18 | 15 | 12 | 8 |

*HiGlass PF062 Series (HIMONT U.S.A., Inc.), published data; compositions based on ungrafted polypropylene homopolymer and include PP-g-MA coupling agent

EXAMPLE 2

Compositions prepared according to Example 1 using ungrafted PP and PP-g-PS (as described above) were compared, at 18.2 vol. % glass, to commercially reported properties of polybutylene terephthalate (PBT) with 30% glass by weight. The effect of the loading difference is to compare the propylene polymers and PBT at equivalent volume % loading in view of the polymer density differences. Physical properties of the resulting compositions were very similar even though the PBT composition was a commercial product (Celanex 1462 brand, Hoechst-Celanese) and the propylene polymer compositions were laboratory prepared, unoptimized compositions); results are reported in Table 2A.

TABLE 2A

| | PP | PP-g-PS | PBT |
|---|---|---|---|
| Izod Impact, ft-lb/in | 1.55 | 1.39 | 1.45 |
| Flex Modulus, k psi | 1075 | 1150 | 1250 |
| Tensile Strength, psi | 15,000 | 15,500 | 18,100 |

Compositions based on PP-g-PS had excellent color properties, gloss off-white with either grey or tan tint. Surface appearance was comparable to or better than commercial PBT (off-white, tan tint) and commercial glass filled PP (translucent yellow-brown).

Compositions were prepared in which the propylene polymer was treated with peroxide (visbroken) to increase melt flow rate and improve processability. Unexpected improvements were obtained in the physical properties of the PP-g-PS compositions containing 30% glass fiber (Owens Corning 457BA brand). As in Example 1, PP-g-MA (Hercoprime G-201) was used as a coupling agent at 1.1 parts per hundred in PP and 2 parts per hundred in PP-g-PS. Compositions were stabilized as in Example 1 except at concentrations of 0.08% P-EPQ, 0 10% Irganox 1010, and 0.25% DSTDP with the addition of 0.07% calcium stearate. Peroxide treatment utilized Xantrix 3025 (HIMONT U.S.A., Inc.; 25 wt. % Lupersol 101) at 0.143 parts per hundred.

Compounds were prepared as in Example 1 except using a ramped barrel temperature in the extruder of 225°–260° C. Samples were injection molded at 800 psi, and at lower pressure for higher flow compositions. Testing was conducted as in Example 1.

Comparisons were also made between PP-g-PS as in Example 1 (85 parts per hundred added styrene graft) and PP-g-P(S-co-MAA); MAA=methacrylic acid, copolymer based on 73 parts per hundred styrene (80 mole %) and 15 parts per hundred MAA (20 mole %).

Peroxide treatment of PP-g-PS increased melt flow from about 2 to 16 dg/min. and also resulted in the following improvements (Table 2B):

TABLE 2B

| | Flexural Modulus (kpsi) | Izod Impact (ft. lb./in.) | Tensile Strength (psi) | Flexural Strength (psi) |
|---|---|---|---|---|
| PP-g-PS[a] | 908 | 1.17 | 13,600 | 18,800 |
| PP-g-PS[b] | 1090 | 1.46 | 14,500 | 20,700 |

[a]Original melt flow rate = 1.1
[b]Original melt flow rate = 2.5

At greater peroxide concentrations flexural modulus and tensile strength decreased very slightly and further improvements in notched Izod were obtained. An unexpected, synergistic improvement resulting from visbreaking was a dramatic improvement in heat deflection temperature (HDT) to a level comparable to that in glass filled, nongrafted PP; Table 2C.

Compositions based on PP-g-P(S-co-MAA) also showed advantageous improvements even in the absence of a glass fiber coupling agent (PP-g-MA) at 30% glass fiber: flexural modulus=1,170 kpsi, notched izod, tensile and flexural strength equal to glass filled PP-g-PS whereas HDT was more than 10° C. greater (from 117° C. to 138° C.); Table 2D.

An assessment was made of several fiber types from several manufacturers including fiber lengths from ⅛ inch to 3/16 inch. The results are summarized in Table 2D.

TABLE 2C

| COMPOUND 2- | 7 | 8 | 9 | 10 | 12 | 13 | 14 | 15 | 16 |
|---|---|---|---|---|---|---|---|---|---|
| MATERIAL: | | | | | | | | | |
| PP[a] | 61.8 | | | | | | | | |
| PP-g-PS | | 63.3 | 80 | 70 | 80 | 70 | 100 | 80 | 70 |
| Glass Fiber[b] | 38.2 | 36.7 | 20 | 30 | 20 | 30 | | 20 | 30 |
| Coupling Agent,[c] pph | 1.1 | 2 | 2 | 2 | 2 | 2 | 2 | 2 | 2 |
| Peroxide[d] | | | | | .143 | .143 | .143 | .242 | .242 |
| PROPERTIES: | | | | | | | | | |
| Notched Izod, ft-lb/in | 1.56 | 1.38 | 1.03 | 1.17 | 1.21 | 1.46 | 0.19 | 1.22 | 1.51 |
| Unnotched Izod, ft-lb/in | 8.2 | 7.6 | 5.9 | 7.6 | 4.5 | 7.6 | 3.9 | 4.6 | 8.7 |
| Flexural Modulus, kpsi | 1080 | 1170 | 723 | 908 | 727 | 1090 | 340 | 724 | 981 |
| Flexural Strength, psi × $10^{-1}$ | 2110 | 2180 | 1680 | 1880 | 1750 | 2070 | 1010 | 1740 | 2050 |
| Tensile Strength (TS), psi × $10^{-1}$ | 1490 | 1530 | 1230 | 1360 | 1240 | 1450 | 589 | 1230 | 1460 |
| Weldline TS, psi | 3850 | 4170 | 4410 | 4100 | 4880 | 4350 | 4290 | 4950 | 4260 |
| TS Retention, % | 26 | 27 | 35 | 30 | 39 | 30 | 73 | 40 | 29 |
| Elongation, Ult., % | 7.1 | 6.6 | 8.0 | 7.0 | 7.9 | 6.9 | 17.5 | 8.1 | 7.5 |
| Weldline Elong., % | 1.4 | 1.4 | 2.2 | 1.8 | 2.5 | 1.7 | 4.8 | 2.5 | 1.7 |
| HDT (264 psi), °F. | 306 | 257 | | 243 | | 266 | | | 267 |
| Melt Flow Rate dg/min | 3.8 | 0.93 | 1.2 | 1.1 | 3.6 | 2.5 | 16 | 5.0 | 4.0 |

[a]Pro-Fax 6301 (HIMONT U.S.A.)
[b]OCF 457BA (Owens-Corning)
[c]Hercoprime G201 (HIMONT U.S.A.);
[d]Xantrix 3025 (HIMONT U.S.A.);
[e]HiGlass SB 224-2 (HIMONT U.S.A.);
[f]HiGlass PF 062-2 (HIMONT U.S.A.)

| COMPOUND 2- | 18 | 19 | 21 | 22 | 23 | A | B |
|---|---|---|---|---|---|---|---|
| MATERIAL: | | | | | | | |
| PP-g-PS | 80 | 70 | 80 | 70 | 100 | | |
| Glass Fiber[a] | 20 | 30 | 20 | 30 | | | |
| Coupling Agent,[b] pph | 2 | 2 | 2 | 2 | 2 | | |

TABLE 2C-continued

| | | | | | | | |
|---|---|---|---|---|---|---|---|
| Peroxide[c] | .363 | .363 | .771 | .771 | .771 | | |
| Control A[d] | | | | | | 100 | |
| Control B[e] | | | | | | | 100 |
| PROPERTIES: | | | | | | | |
| Notched Izod, ft-lb/in | 1.25 | 1.48 | 1.36 | 1.67 | 0.17 | 2.80 | 1.40 |
| Unnotched Izod, ft-lb/in | 5.1 | 5.9 | 3.5 | 7.1 | 3.2 | 12 | 11 |
| Flexural Modulus, kpsi | 752 | 937 | 762 | 1020 | 342 | 500 | 590 |
| Flexural Strength, psi × $10^{-1}$ | 1800 | 1950 | 1670 | 2000 | 923 | 1250 | 1700 |
| Tensile Strength (TS), psi × $10^{-1}$ | 1240 | 1420 | 1130 | 1400 | 533 | 880 | 1140 |
| Weldline TS, psi | 4790 | 4280 | 4360 | 3860 | 4620 | NA | NA |
| TS Retention, % | 39 | 30 | 39 | 28 | 87 | NA | NA |
| Elongation, Ult., % | 7.7 | 7.1 | 6.6 | 6.4 | 7.3 | 3.7 | 2.9 |
| Weldline Elong., % | 2.4 | 1.7 | 2.1 | 1.5 | 5.3 | NA | NA |
| HDT (264psi), °F. | | 278 | | 280 | 243 | 260 | 300 |
| Melt Flow Rate, dg/min | 7.1 | 6.5 | 22 | 18 | 68 | 18 | 18 |

[a] OCF 457BA (Owens-Corning)
[b] Hercoprime G201 (HIMONT U.S.A.)
[c] Xantrix 3025 (HIMONT U.S.A.)
[d] HiGlass SB 224-2 (HIMONT U.S.A.)
[e] HiGlass PF 062-2 (HIMONT U.S.A.)

TABLE 2D

| COMPOUND 2- | 24 | 25 | 28 | 29 | 30 | 31 | 32 | 33 | 34 | 35 |
|---|---|---|---|---|---|---|---|---|---|---|
| MATERIAL: | | | | | | | | | | |
| PP-g-PS/MAA | 80 | 70 | | | | | | | | |
| PP-g-PS | | | 70 | 70 | 70 | 70 | 70 | 70 | 70 | 70 |
| OCF 408 BC (3/16") | 20 | 30 | | | | | | | | |
| OCF 473 AA (3/16") | | | 30 | | | | | | | |
| PPG 3090 (K, ¼") | | | | 30 | | | | | | |
| PPG 3540 (G. ¼") | | | | | 30 | | | | | |
| PPG 3541 (K, ¼") | | | | | | 30 | | | | |
| Manville 726 (3/16") | | | | | | | 30 | | | |
| Manville 726 (¼") | | | | | | | | 30 | | |
| Manville 732 (3/16") | | | | | | | | | 30 | |
| Manville 732 (¼") | | | | | | | | | | 30 |
| Hercoprime G201, pph | | | 2 | 2 | 2 | 2 | 2 | 2 | 2 | 2 |
| PROPERTIES: | | | | | | | | | | |
| Notched Izod, ft-lb/in | 0.59 | 0.75 | 1.4 | 1.51 | 1.31 | 1.29 | 1.48 | 1.47 | 1.36 | 1.33 |
| Unnotched Izod ft-lb/in | 3.3 | 3.0 | 7.4 | 9.9 | 7.9 | 5.7 | 10.3 | 10.4 | 9.0 | 7.9 |
| Flexural Modulus, kpsi | 580 | 1170 | 990 | 1010 | 942 | 1140 | 960 | 929 | 986 | 1020 |
| Flexural Strength psi × $10^{-1}$ | 1160 | 1500 | 1876 | 2250 | 1840 | 1730 | 2210 | 2170 | 2180 | 2180 |
| Tensile Strength (TS), psi × $10^{-1}$ | 807 | 1050 | 1360 | 1570 | 1310 | 1240 | 1540 | 1520 | 1500 | 1500 |
| Weldline TS, psi | 3790 | 3360 | 4070 | 4870 | 3770 | 3660 | 4520 | 4620 | 4160 | 4370 |
| TS retention, % | 47 | 32 | 29 | 31 | 29 | 30 | 29 | 30 | 27 | 29 |
| Elongation, Ult., % | 5.7 | 4.1 | 6.5 | 7.9 | 6.5 | 5.2 | 7.9 | 8.1 | 7.2 | 7.5 |
| Weldline Elong., % | 2.2 | 1.1 | 1.6 | 1.9 | 1.5 | 1.3 | 1.8 | 1.9 | 1.7 | 1.8 |
| HDT (264 psi), °F. | 252 | 268 | | 248 | | | 246 | | | |
| Melt Flow Rate, dg/min | 2.4 | 0.95 | 0.80 | 0.75 | 0.63 | 0.58 | 0.69 | 0.78 | 0.75 | 0.62 |

EXAMPLE 3

Impact modified blends were prepared using PP-g-PS as described in Example 1 filled with 20 and 30% glass fiber. Rubber modification was at the 15 and 25% levels in the polymer matrix and included polypropylene and ethylene-propylene copolymers, containing ethylene propylene rubber, ethylene-acrylate copolymer with maleic anhydride functionality (Lotader 2700, Atochem), styrene butadiene/ethylene propylene rubber (Kraton G1652/Dutral CO-059). A range of flexural modulus/notched Izod impact strength properties were obtained demonstrating the ability of the compositions to be impact modified. The best overall balance of impact (Izod)/stiffness (flexural modulus) was 3.8 ft.-lb./in./720 kpsi for 30% glass and 25% rubber level; and 3.6 ft.-lb./in./500 kpsi for 20% glass fiber. Another composition including 25% EPR in a 30% glass filled blend resulted in 6.7 ft.-lb./in./460 kpsi.

EXAMPLE 4

A laboratory optimization study was conducted utilizing PP-g-PS (homopolymer polypropylene precursor in spherical form, 9.1 MFR, 0.53 cc/g porosity, 97.8% insoluble in xylene at room temp., Mw/Mn=4.5; grafted with 79.2 pph added styrene, 2.0 pph active peroxide based on Lupersol PMS, t-butyl peroxy 2-ethylhexanoate, 50% in mineral spirits; grafting temperature 120° C, styrene feed rate 0.5 pph/min. over 170 min.; peroxide co-feed 0.0117 pph/min.; approximately 30 min. hold at 120° C.; dried at 135° C. for 180 min.; produced by separate, co-continuous addition method). Compositions were prepared containing glass fiber concentrations of 10, 20, 30, 40 and 50% and tested as described generally in Example 1; visbreaking was included as described earlier. At a preferred glass fiber content of 30% the following optimized parameters were identified:

| Parameter | Condition |
|---|---|
| Glass fiber sizing[a] | epoxy silane |
| Screw design, mm | 280 |
| Process temperature, °C. | 280 (flat profile) |
| Screw speed, rpm | 350 |
| Feed rate, lb./hr. | 125 |
| Coupling agent[b] level, pph | 2 |
| Peroxide level[c] (on carrier), pph | 0.2 |
| Molding temperature, °F. | 500 |

[a]Glass fiber PPG 3090, ⅛ inch fiber length
[b]Coupling agent Hercoprime HG201
[c]Dispersed on carrier, Xantrix 3025 at 25 wt. %.
Blend compositions stabilized with 0.08% P-EPQ, 0.10% Irganox 1010, 0.25% DSTDP and 0.07% calcium stearate.

A molded 5×5 plaque of the optimized formulation had outstanding surface appearance, including near white color and a glossy surface. Optimized properties for a composition based on 30% glass fiber are summarized below:

| Property | Value |
|---|---|
| Flexural modulus, kpsi | 1,020 |
| Flexural strength, psi | 23,800 |
| Notched Izod, ft.-lb./in. | 2.09 |
| Unnotched Izod, ft.-lb./in. | 12.9 |
| Tensile strength, psi | 17,000 |
| Weldline strength, psi | 4,780 |
| Elongation, % | 8.5 |
| HDT, °C. | 141 |
| MFR, g/10 min. | 2.9 |

Furthermore, it is expected that the presence of amorphous polystyrene in the composition, resulting from the solid state (melt phase) grafting process, should result in reduced molded-in stresses and greater dimensional stability compared to compositions based on strictly crystalline matrices.

EXAMPLE 5

Alternative grafted propylene polymer materials and blends with various modifiers were evaluated as described above, as well as fillers for use in combination with glass fibers (glass and ceramic spheres). Grafted propylene polymers included polypropylene grafted with styrene and acrylonitrile (PP-g-PS/AN) and polypropylene grafted with styrene and methyl methacrylate (PP-g-PS/MMA). Additionally, grafted propylene polymer material was evaluated as a blend with a high modulus polypropylene polymer with and without 15% rubber addition for impact modification. The polypropylene grafted with polystyrene (25 pph monomer) was based on a highly crystalline, monomodal distribution polypropylene.

It was determined that compositions using PP-g-PS/MMA result in properties equivalent to PP-g-PS, but with superior colorability. Blends of PP-g-PS with a higher modulus type polypropylene can advantageously produce compositions with improved dimensional stability/warpage/shrinkage characteristics. The use of glass spheres can reduce the cost of glass fiber reinforced compositions with minor reductions in properties.

EXAMPLE 6

Various coupling agents were evaluated at concentrations of 2 and 5 parts per hundred in a glass fiber filled, grafted propylene polymer material (PP-g-PS), prepared as follows: 85 pph styrene was grafted to the polypropylene homopolymer precursor described in Example 4 using an active peroxide level of 1.68 pph at a co-feed rate of 0.0198 pph/min.; grafting temperature 120° C.; styrene feed rate was 1.0 pph/min. over a period of 85 min.; grafted polymer was held at 120° C. for 30 min. and dried at 135° C. for 180 min. The glass fiber used was PPG 3090 (⅛ inch); stabilization was the same as in Example 4. Compositions were prepared by blending all materials except glass fiber in a Henschel blender and compounding as in the examples above except that a Leistritz twin screw extruder was used (screw profile number 4) with a flat 250° C. temperature profile, 350 rpm screw speed and 50 lb./hr. throughput rate. To maximize glass fiber distribution, parts were molded using 500° F. barrel temperature, 150° F. mold temperature and 10,000 psi injection pressure. Parts were tested as in Example 1.

The best overall balance of properties was obtained with Hercoprime G-201 coupling agent (HIMONT, U.S.A., Inc.), PP-g-MA (MA=maleic anhydride). Other effective commercial materials included Hercoprime G-211 (containing less MA) and grafted styrene-ethylene-butadiene-styrene copolymer. Other materials useful as coupling agents, but less preferred based on this evaluation included polypropylene grafted with about 6% acrylic acid (BP Polybond 1001); polypropylene grafted with 0.5 and 1% MA (BP Polybond 3001 and 3002; ethylene propylene rubber grafted with 4% MA (Exxon Exelor VA 1801-high crystallinity rubber and VA 1803-amorphous rubber); ethylene propylene diene monomer rubber grafted with 2% MA (Royaltuff 465 A); and ethylene-ethylacrylate copolymer (Atochem Lotader 4700).

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A composition consisting essentially of, by weight;
 (a) from about 40 to about 95% of a propylene polymer material grafted in the solid state with styrenic-vinyl monomer copolymer, which grafted material comprises ungrafted styrenic-vinyl monomer copolymer, wherein the total concentration of the styrenic and vinyl monomers added during the grafting of said propylene polymer material is from about 50 to about 200 parts by weight per hundred parts by weight of said propylene polymer material, and said vinyl monomer is present during said grafting at a concentration expressed as a percentage of said total monomer concentration of from about 0.1 to about (A) 35.0 weight % when said monomer is an acrylonitrile, (B) 60 weight % when said monomer is an unsaturated carboxylic acid or anhydride, and (C) 100 weight % when said monomer is an acrylate, and wherein the quantity of said ungrafted styrenic-vinyl monomer copolymer is from about 35 to about 95 weight percent of the total grafting monomer;

(b) from about 5 to about 60% of glass fibers treated with an organic silane compound; optionally (c) from about 1 to about 25% of at least one rubber polymer component comprising (1) from about 0 to 100% of at least one of
(i) monoalkenyl aromatic hydrocarbon conjugated diene block copolymers,
(ii) hydrogenated products of (i), and
(iii) mixtures of (i) and (ii); and (2) from about 100 to 0% of an olefin copolymer rubber; and (d) a coupling agent for said glass fibers in an amount of from about 1 to about 10 parts per hundred parts of said propylene polymer material plus said rubber polymer component when present; and wherein the total amount of (a)+(b)+(c)+(d) is 100.

2. The composition of claim 1 wherein said styrenic monomer to be grafted is selected from the group consisting of styrene, an alkyl ring-substituted styrene where the alkyl is methyl or ethyl, combinations thereof wherein the alkyl ring-substituted styrene is present in an amount of from 5 to 95%, or a combination of styrene or an alkyl ring-substituted styrene with 5 to 40% of alpha-methylstyrene or alpha-methylstyrene derivatives.

3. The composition of claim 1 wherein component (c) is one or more monoalkenyl aromatic hydrocarbon-conjugated diene block copolymer of a linear or branched A-B, A-B-A or radial (A-B)$_n$, type, hydrogenated products thereof or mixtures thereof, wherein A is monoalkenyl aromatic hydrocarbon polymer block, B is a conjugated diene polymer block and n=3-20.

4. The composition of claim 3, wherein component (c) is of the A-B-A type or a 50/50 mixture of a hydrogenated monoalkenyl aromatic hydrocarbon-conjugated diene of the A-B-A type and of the A-B type or two A-B-A types.

5. The composition of claim 1 wherein component (c) is selected from the group consisting of ethylene-propylene copolymer rubber, ethylene-propylene-nonconjugated diene monomer rubber, and homopolymers of propylene or a random copolymer of propylene and an olefin selected from ethylene and $C_4$-$C_{10}$ alpha-olefins impact-modified with greater than about 30 wt. % ethylene-propylene copolymer rubber, or ethylene-propylene-nonconjugated diene monomer rubber.

6. The composition of claim 1, wherein said olefin copolymer rubber of component (c) is present in an amount of from about 1 to about 25% and is a mixture including an ethylene-propylene monomer rubber or an ethylene-propylene-diene monomer rubber.

7. The composition of claim 1 wherein said grafted propylene polymer material is visbroken.

8. The composition of claim 1 wherein said coupling agent (d) is a propylene polymer material which has been modified by chemical reaction with an ethylenically unsaturated polycarboxylic acid or a derivative of such acid.

9. The composition of claim 8 wherein said coupling agent is a maleic anhydride-modified propylene polymer material having a maleic anhydride content of about from 1% to 10% based on the weight of the modified polypropylene.

10. The composition of claim 1 wherein said vinyl monomer is selected from the group consisting of acrylic acid, methacrylic acid, maleic acid, citraconic acid, maleic anhydride, citraconic anhydride, mono- and dimethyl maleate, methyl acrylate, ethyl acrylate, propyl acrylate, butyl acrylate, methyl methacrylate, ethyl methacrylate, propyl methacrylate, butyl methacrylate, cyclohexyl methacrylate phenyl methacrylate, benzyl methacrylate, o-methoxyphenyl methacrylate, acrylonitrile, methacrylonitrile, glycidyl acrylate, glycidyl methacrylate and mixtures thereof.

11. The composition of claim 1 wherein said styrenic monomer is styrene or a mixture of styrene and alpha-methylstyrene, said vinyl monomer is methyl methacrylate and said propylene polymer material is selected from the group consisting of polypropylene, ethylene-propylene random copolymer, polypropylene impact modified with ethylene-propylene rubber.

12. The composition of claim 11 wherein the total methyl methacrylate and styrenic monomer during grafting is from about 50 to about 200 parts per hundred and said methyl methacrylate is present at a concentration of from about 0.1 to about 100 wt. % of said total monomer content.

13. The composition of claim 1 wherein said organic silane compound is selected from the group consisting of vinyltrichlorosilane, vinyltris(beta-methoxyethoxy)silane, vinyltriethoxysilane , gamma-methacryloxypropyltrimethoxysilane, beta-(3,4-epoxycyclohexyl)ethyltrimethoxysilane, gamma-glycidoxypropyltrimethoxysilane, N-(beta-aminoethyl)-gamma-aminopropyltrimethoxysilane, N-(beta-aminoethyl)-gamma-aminopropylmethyldimethoxysilane, gamma-aminopropyltriethoxysilane, N-phenyl-gamma-aminopropyltrimethoxysilane, gamma-methylcaptopropyltrimethoxysilane, and gamma-chloropropyltrimethoxysilane.

* * * * *